United States Patent

Paulson

[11] 4,017,836
[45] Apr. 12, 1977

[54] EVENT STACKER AND DISPLAY DEVICE

[75] Inventor: Wesley R. Paulson, Ventura, Calif.

[73] Assignee: The United States of America as represented by the Secretary of the Navy, Washington, D.C.

[22] Filed: Apr. 5, 1976

[21] Appl. No.: 673,494

[52] U.S. Cl. .............................. 340/172; 340/190; 340/225; 340/347 DA; 340/409

[51] Int. Cl.² .................. G08B 29/00; H03K 13/04

[58] Field of Search ...... 340/172, 225, 409, 253 C, 340/253 R, 190, 347 DA; 307/237, 264; 324/96

[56] References Cited

UNITED STATES PATENTS

| | | | |
|---|---|---|---|
| 3,566,400 | 2/1971 | Gilbert | 340/409 |
| 3,581,303 | 5/1971 | Kelly | 340/347 DA |
| 3,646,552 | 2/1972 | Fuhr | 340/409 |
| 3,854,089 | 12/1974 | Emler | 340/172 X |
| 3,924,229 | 12/1975 | Liu | 340/347 DA |

*Primary Examiner*—Donald J. Yusko
*Attorney, Agent, or Firm*—Richard S. Sciascia; Joseph M. St.Amand; William W. Cochran, II

[57] ABSTRACT

An event stacker and display device for encoding a multiplicity of event signals into a single output source. The system uses an operational amplifier having three inputs weighted in a "four, two, one" octal fashion. The output of the amplifier is therefore restricted to one of eight possible levels. An optical isolator is also used in the system in conjunction with a Darlington amplifier and a light emitting diode (LED) display device. The optical isolator provides isolation between test equipment and other instrumentation. The Darlington amplifier provides sufficient current to drive the LED display device and the event stacker.

7 Claims, 3 Drawing Figures

EVENT STACKER AND DISPLAY DEVICE

BACKGROUND OF THE INVENTION

The present invention pertains generally to electronic instrumentation and more particularly to isolators and event stackers. In various instrumentation schemes, it is necessary to provide a recording system capable of reproducing a multiplicity of event signals. Existing recording systems have generally lacked channel capacity for recording a large number of signals, e.g., as many as 24 on a single recorder. As a result, more than one multiple channel recorder has been required to record this many event signals. Since these recorders are expensive, a system has been needed which will record numerous event signals upon a single recorder channel, thereby reducing the overall number of recorders required. Prior systems which have provided such coding systems have lacked the capability of electrical isolation between the encoding device and the equipment under test. Consequently, electrical feedback signals have often times caused damage to this electrical equipment. In addition, a convenient method for displaying the presence of an event signal to allow the operator to visually perceive the existence of the signal prior to being encoded has not been provided by the prior art devices.

SUMMARY OF THE INVENTION

The present invention overcomes the disadvantages and limitations of the prior art by providing an improved event stacker and display device. The event stacker and display device of the present invention comprises an encoder which converts binary information into an encoded output. These binary input event signals can therefore, for example, be reduced to a single output, thereby essentially reducing the number of required recording channels by a factor of three. An optical isolator is provided to isolate electrical signals produced by the encoder from test equipment which might be damaged. The signal from the optical isolator is boosted in a Darlington amplifier which is in turn used to run a LED display device indicating the presence of a binary event signal.

It is therefore an object of the present invention to provide an improved event stacker and display device.

It is also an object of the present invention to provide an event stacker and display device for reducing three event signals to a single input data source.

Another object of the present invention is to provide an event stacker and display device which provides isolation between test equipment and the recording system.

Another object of the present invention is to provide an event stacker which is capable of providing a display of each binary event signal.

Other objects and further scope of applicability of the present invention will become apparent from the detailed description given hereinafter. The detailed description indicating the preferred embodiment of the invention is given only by way of illustration since various changes and modifications within the spirit and scope of the invention will become apparent to those skilled in the art from this detailed description. The foregoing abstract of the disclosure is for the purpose of providing a non-legal brief statement to serve as a searching or scanning tool for scientists, engineers and researchers and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT

Figure 1:
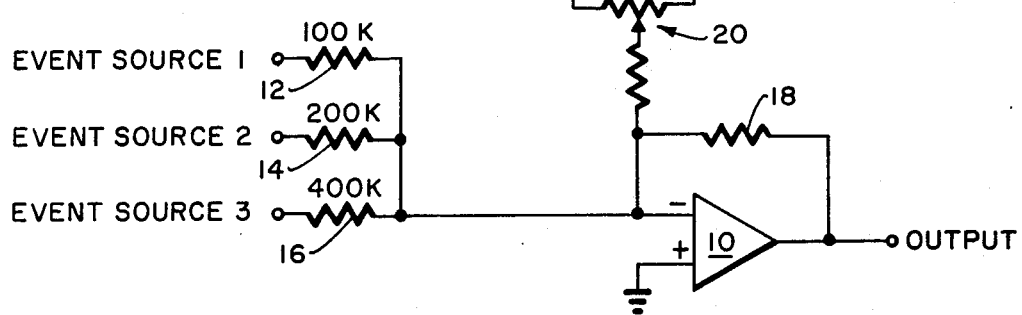
FIG. 1 is a schematic diagram of an octal encoder used in the preferred embodiment of the invention.
Figure 2:
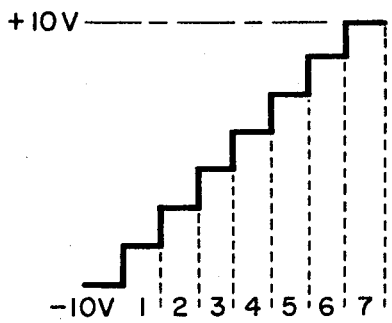
FIG. 2 is a diagram of the octal signal produced at the output of the encoder of FIG. 1.

FIG. 1 discloses the octal encoder for encoding three event sources into a single output. The heart of the encoder or stacker is a low-cost IC operational amplifier 10. Used in conjunction with the operational amplifier 10, are a series of precision resistors 12 through 18 which determine the arithmetic operations performed by the operational amplifier 10. The event source inputs 1 through 3 are connected to a summing junction at the input of the amplifier through precision resistors 12 through 16. Assuming the binary signals of the event sources are equal on the event source channels 1 through 3, the weighting of the resistors 12 through 16 affects the output signal level in an inversely proportional manner. For example, if the inputs are weighted in a four, two, one (octal) fashion as shown in FIG. 1, and the event source signals are binary in nature, i.e., having either a high or a low voltage, the output signal will vary in amplitude and will be restricted to one of eight possible voltage levels as shown in FIG. 2. In this manner, the recording tracks required for the event sources is effectively reduced by a third. The existence of an event source signal can be uniquely determined at any instant by detecting the level of the output signal, as shown in FIG. 2.

Figure 3:
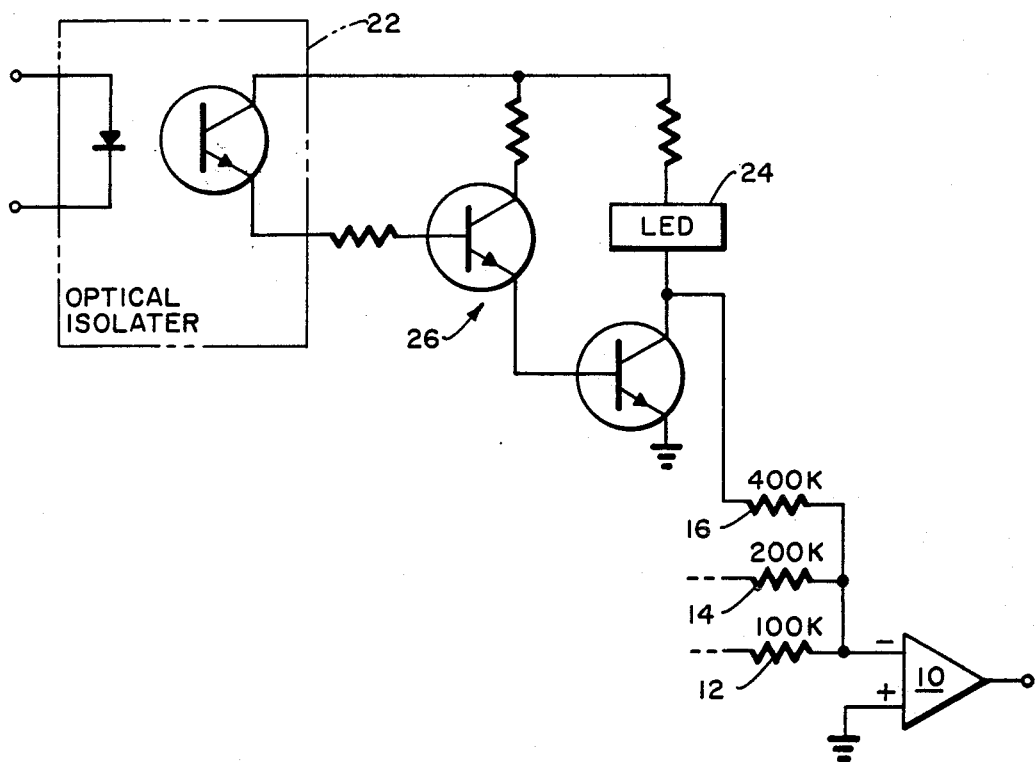
FIG. 3 is a schematic diagram of a single channel of the overall system of the preferred embodiment of the invention.

FIG. 3 is an overall schematic diagram of a single channel of the preferred embodiment of the invention. An optical isolator 22 is inserted between the event source and the operational amplifier 10. It serves the dual purpose of protecting the equipment under test from damaging voltage levels which might possibly be fed back from the instrumentation into the equipment under test. In addition, they remove the instrumentation ground from the signal ground for further isolation, often times required by the equipment under test.

Since the binary inputs being monitored from the series of event sources are limited in current, the signal must be modified to properly drive the event stacker and a display device. For example, the event source typically comprises a binary signal of approximately one milliamp. The optical isolator is intended to be used at a nominal current of 50 milliamps. The Darlington amplifier 26 amplifies the binary signal to produce a signal which will activate the display device 24 and operational amplifier 10. Actual implementation of the stacker includes a light emitting diode as the display device 24, which is located on the front panel of the stacker to enable the operator to easily verify event status during operation.

The preferred embodiment therefore provides an event stacker which is capable of reducing the number of required recording channels by a factor of three through the use of octal encoding while simultaneously providing signal isolation and display capability.

Obviously many modifications and variations of the present invention are possible in light of the above teachings. For example, although the preferred embodiment discloses an octal encoder, any number of event signals can be encoded in any manner, limited only by the bandwidth of the recording system. It is therefore to be understood that within the scope of the appended claims the invention may be practiced otherwise than as specifically described.

What is claimed is:
1. An event stacker and display device for encoding a multiplicity of event signals into a single output source comprising:
   a. optical isolator means for transmitting event signals produced by test equipment;
   b. Darlington amplification means for amplifying said event signals transmitted by said optical isolator means;
   c. display means connected to said Darlington amplification means for indicating the presence of said event signals;
   d. resistive means connected between a summing junction and said display means; and
   e. operational amplification means connected to said summing junction for amplitude encoding said event signals into a single output source.

2. The device of claim 1 wherein said optical isolator means comprises a light emitting diode and a light sensitive transistor.

3. The device of claim 1 wherein said display means comprises a light emitting diode.

4. The device of claim 1 wherein said operational amplification means comprises an operational amplifier with a resistive feedback device.

5. The device of claim 2 wherein said display means comprises a light emitting diode.

6. The device of claim 3 wherein said operational amplification means comprises an operational amplifier with a resistive feedback device.

7. The device of claim 2 wherein said operational amplification means comprises an operational amplifier with a resistive feedback device.

* * * * *